United States Patent [19]

Honke

[11] 4,396,212

[45] Aug. 2, 1983

[54] ROTARY FLUID COUPLING

[75] Inventor: Heinrich Honke, Bochum, Fed. Rep. of Germany

[73] Assignee: Gebr. Eickhoff Maschinenfabrik und Eisengiesserei m.b.H, Bochum, Fed. Rep. of Germany

[21] Appl. No.: 135,404

[22] Filed: Mar. 31, 1980

[51] Int. Cl.³ .............................................. F16L 17/00
[52] U.S. Cl. ...................................... 285/94; 285/98; 285/100; 285/108; 285/190
[58] Field of Search ....................... 285/94, 98, 99, 101, 285/106, 108, 190; 184/41; 277/56, DIG 8

[56] References Cited

U.S. PATENT DOCUMENTS

| 945,180 | 1/1910 | Ljungstrom | 277/56 |
|---|---|---|---|
| 2,245,281 | 6/1941 | Klopak | 277/56 |
| 2,270,927 | 1/1942 | Browne | 285/94 |
| 2,349,696 | 5/1944 | Behrens | 285/101 X |
| 2,558,990 | 7/1951 | Stahl et al. | 285/94 X |
| 2,877,026 | 3/1959 | Payne et al. | 285/108 X |
| 2,937,029 | 5/1960 | Colby | 285/98 X |
| 2,985,468 | 5/1961 | Shaw et al. | 285/94 X |
| 3,694,008 | 9/1972 | Slator | 285/94 |

FOREIGN PATENT DOCUMENTS

| 382815 | 10/1973 | U.S.S.R. | 285/94 |
|---|---|---|---|
| 496423 | 2/1976 | U.S.S.R. | 285/94 |

Primary Examiner—Dave W. Arola
Attorney, Agent, or Firm—Thomas H. Murray; Clifford A. Poff

[57] ABSTRACT

A rotary fluid coupling for conveying fluid from a stationary shaft to a hub rotatably mounted on the shaft, or vice versa. The coupling is characterized in having an annular piston which surrounds the shaft and which forms a wall of a chamber connecting a duct in the shaft to a duct in the wall of the hub. A seal is disposed around the shaft between the piston and a closed end of a bore in the hub. In the bore between the piston and the seal is a lubricating material such that pressure exerted on the piston by fluid in the aforesaid chamber will be transmitted by the lubricating material to the seal, preferably a labyrinth seal.

11 Claims, 3 Drawing Figures

ROTARY FLUID COUPLING

BACKGROUND OF THE INVENTION

As is known, a rotary fluid coupling enables liquid to be transferred between two relatively rotating parts, such as a stationary shaft and the hub of a shearing drum of a mining machine, the hub being rotatably mounted on the shaft. While many such couplings have been devised in the past, many are not suitable for high-pressure applications and have a tendency to leak.

SUMMARY OF THE INVENTION

In accordance with the present invention, a new and improved rotary fluid coupling is provided which is suitable for high-pressure applications. Specifically, a fluid coupling is provided for interconnecting a liquid-conveying duct in a shaft element to a duct in a hub element, one element being rotatable with respect to the other. A bore in the hub element receives the aforesaid shaft element. An annular piston surrounds the shaft and is reciprocable within the bore. This piston forms a wall of a chamber which connects the duct in the shaft element to the duct in the hub element. Lubricating material is disposed between the piston and a seal which surrounds the shaft element such that the seal, via the lubricant, is exposed to pressure exerted on the piston by fluid in the aforesaid chamber interconnecting the two ducts.

In a coupling of this type, the high-pressure of the fluid in the chamber interconnecting the two ducts acts on the annular piston and applies to the lubricating material between the piston and the seal a pressure which corresponds to the pressure of the liquid flowing through the annular chamber. This precludes any transfer of fluid from one side of the annular piston to the other. The pressure acting on the piston causes only a small portion of the high-viscosity lubricant to issue through the gaps of the seal, preferably a labyrinth seal, and travel through bushings at opposite ends of the hub through which the aforesaid shaft extends.

In one embodiment of the invention shown herein, there are two annular pistons surrounding the shaft. These annular pistons form an annular chamber which interconnects the ducts in the shaft and the hub. Labyrinth seals are provided at opposite ends of the hub to prevent the escape of fluid therefrom. Conveniently, spring elements are interposed between the two annular pistons, these spring elements acting to apply pressure to the lubricant between the pistons and the seal even when there is no relative rotation between the hub and the shaft.

The above and other objects and features of the invention will become apparent from the following detailed description taken in connection with the accompanying drawings which form a part of this specification, and in which.

Figure 1:
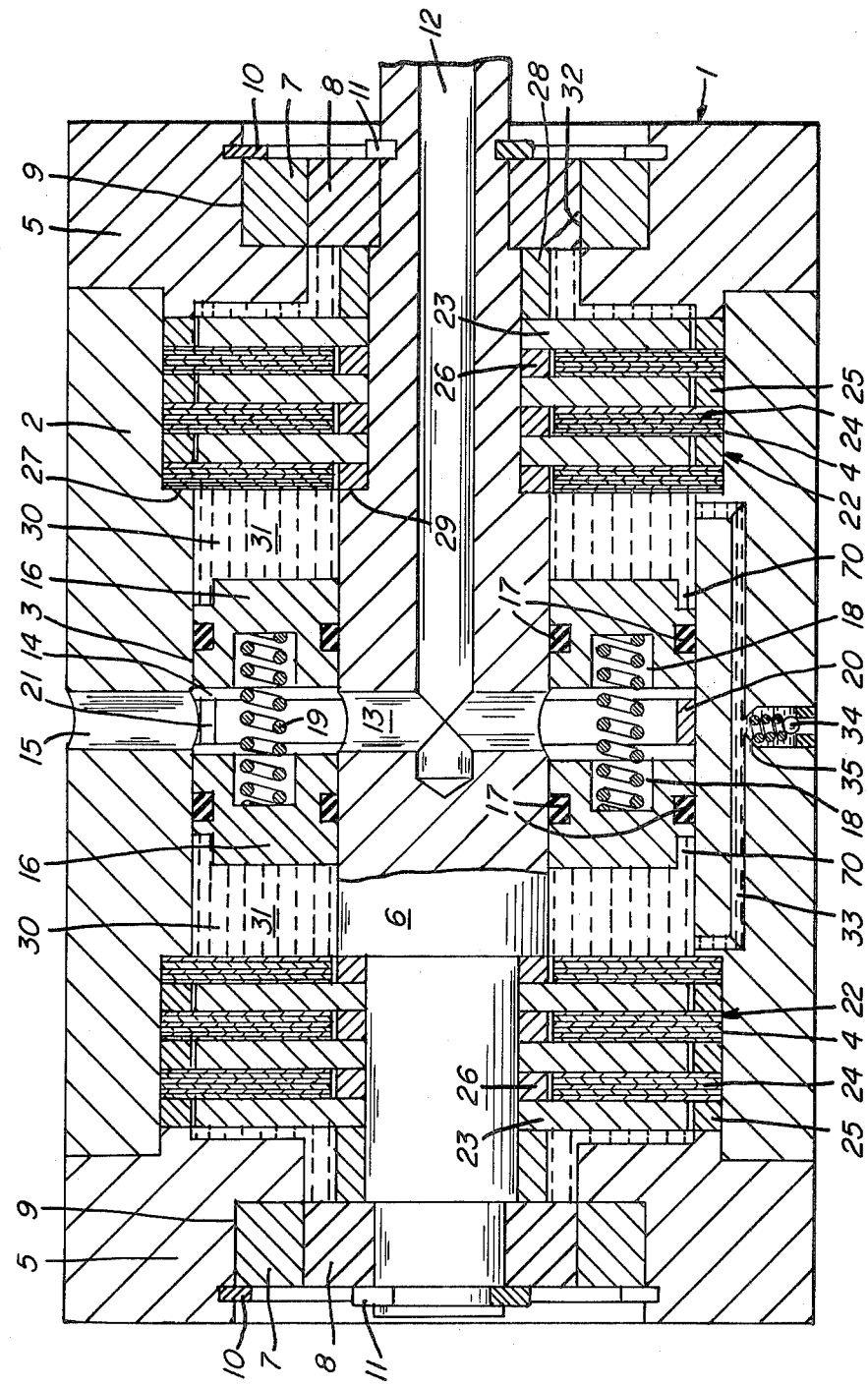
FIG. 1 is a cross-sectional view of one embodiment of the invention employing double pistons and double seals.

With reference now to the drawings, and particularly to FIG. 1, the rotary fluid coupling shown is identified generally by the reference numeral 1 and includes a cylindrical hub 2 having a bore 3 extending axially therethrough and formed at both ends with a recess which receives an associated cover plate 5 in sealing engagement. A shaft 6 extends into the bore 3 and is journaled at each of the two ends of the bore by a pair of bushings 7 and 8 disposed concentrically one inside the other in bores 9 formed in the cover plates 5. The outer bushings 7 are non-rotatably secured to the inner periphery of the bore 9; while the inner bushings 8 are non-rotatably secured to the shaft 6 whereby the inner periphery of each bushing 7 rides on the outer periphery of its associated bushing 8. Spring clips 10 and 11 secure the respective bushings 7 and 8 within the bores 9 and on the shaft 6.

High-pressure liquid is supplied to a central bore 12 extending through the shaft 6, the bore 12 communicating with radial bores 13 and an annular chamber 14 formed between the shaft 6 and the periphery of the bore 3. Liquid entering the chamber 14 can pass through radial passageway 15 formed in the wall of the hub 2. Disposed within the chamber 14 are two axially-movable annular pistons 16 mounted for movement in the inner periphery of the bore 3 and the outer periphery of the shaft 6. The pistons 16 are provided with ring gaskets 17 as shown. Circumferentially spaced around the facing surfaces of the pistons 16 are cylindrical holes 18 which receive the opposite ends of helical springs 19. A spacing collar 20 acts to limit axial movement of the two pistons toward each other and has an opening or break 21 therein which permits liquid to flow from chamber 14 to bore 15, or vice versa.

Disposed between each piston 16 and each of the two cover plates 5 is a labyrinth seal comprising two meshing and relatively rotatable groups of discs 23 and 24. Rings 25 and 26 between the discrete discs 23 and 24 maintain the discs far enough apart to permit them to rotate without contacting each other. The cover plates 5 press the radial outer groups of discs 24 against shoulders 27 formed in the bore 3. In a similar manner, the inner groups of discs 23 are pressed against shoulders 29 formed in the shaft 6 by means of annular spacers 28 which abut bushings 8. Chambers 30 between the pistons 16 and their associated labyrinth seals 22 are filled with a barrier or sealing material 31, preferably a high-viscosity lubricant. The pressure applied by the liquid in the chamber 14 and the springs 19 to the two facing surfaces of the pistons 16 pressurizes the lubricant 31 in the two chambers 30 to a pressure substantially equal to the working pressure of the high-pressure liquid in bores 12 and 15. Because of the viscosity of the lubricant 31, only relatively small quantities of the lubricant will pass through the narrow gaps of the labyrinth seals 22 to gaps 32 where it acts as a lubricant between the mating surfaces of the bushings 7 and 8.

A common bore 33 interconnects the annular chambers 30 which contain the lubricant 31. Bore 33, in turn, is connected to a bore 35 which extends through the hub periphery and which contains a check valve 34 through which the lubricant 31 is forced into the two annular chambers 30. As a result of the springs 19 and the pressure within annular chamber 14, the two pistons 16 always assume a substantially-symmetrical positioning in relation to the radial bores 13 and 15; and there is a continuous pressure equalization between the two chambers 30.

Figure 2:
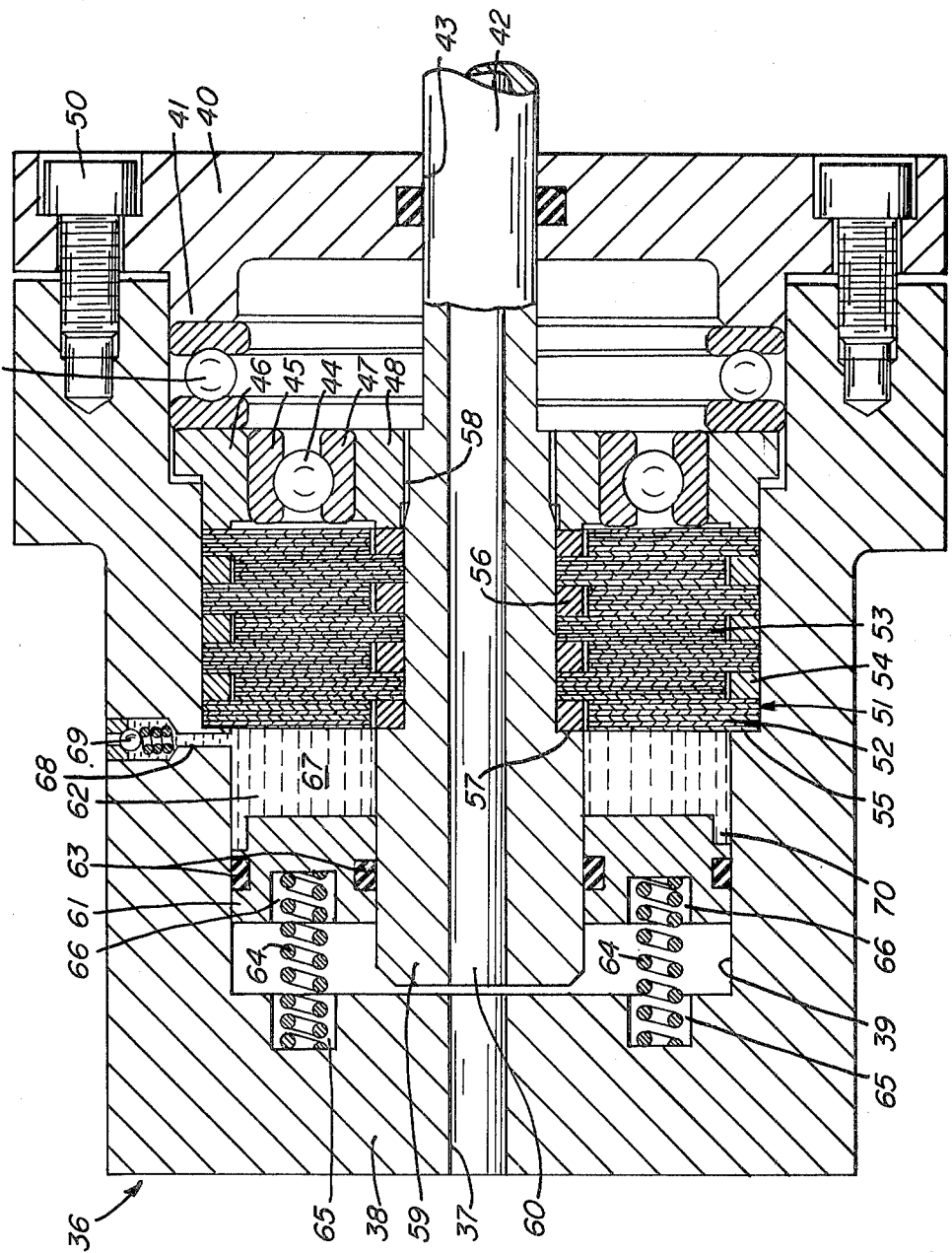
FIG. 2 is a cross-sectional view of another embodiment of the invention wherein a single piston and single seal are employed and wherein fluid enters or exits from a hub element along an axial bore.

With reference now to FIG. 2, another embodiment of the invention is shown, the fluid coupling being identified generally by the reference numeral 36. The joint comprises a hub 38 having a central bore 39 which extends to only one end face of the hub. A cover plate 40 is provided with an annular collar 41 which fits into the bore 39. A shaft 42 extends through a bore 43 in the cover plate 40 into the hub interior and is mounted within a ball bearing 44 whose outer race 45 abuts a flanged ring 46. The inner race 47 of the ball bearing abuts against a bushing 48 which surrounds the shaft 42 and is threaded thereto. Between the annular collar 41 on cover plate 40 and the flanged ring 46 is a thrust bearing 49, the bearing being securely held between the shoulder 41 and ring 46 by proper tightening of screws 50. The flanged ring 46, in turn, is in abutment with a labyrinth seal 51 which, like the embodiment of FIG. 1, comprises two meshing disc groups 52 and 53. The outer group 52 is mounted in the hub bore 39, individual discs in the group being spaced apart by rings 54. The outer group 52 is held between shoulder 55 and the flanged ring 46 by proper tightening of the screws 50. Similarly, the inner group of discs 53 is spaced apart by rings 56 which are slightly thicker than the disc thickness. These are pressed against a shoulder 57 in shaft 42 by means of the inner bushing 48. In this regard, the bushing 48 is threaded onto the shaft at 58 and may be tightened against the rings 56.

The left end 59 of the shaft 42 projects from the labyrinth seal into the blind end of the bore 39. Extending through the shaft 42 is an axial bore 60 which is aligned with a bore 37 in the hub 38. Bore 60, in turn, is adapted to be connected to a source of high-pressure fluid. Annular piston 61 surrounds portion 59 of the shaft 42 and forms an annular chamber 62 containing a high-viscosity lubricant 67, the same as in the embodiment of FIG. 1. Piston 61 is provided with appropriate seals 63 and, as in the embodiment of FIG. 1, is provided with circumferentially-spaced openings 66 which receive coil springs 64, the other ends of the coil springs 64 being received within bores 65 formed in the blind end of the bore 39. A high-viscosity lubricant can be forced into the chamber 62 through check valve 69 and duct 68. As in the embodiment of FIG. 1, the pressure of the fluid within the chamber formed between the blind end of bore 39 and piston 61 exerts a pressure on the high-viscosity lubricant 67 which, in turn, exerts a pressure on the labyrinth seal 51.

In both embodiments of the invention (FIGS. 1 and 2), the annular pistons 16 or 61 are formed near the filling duct 33 or 68 with a recess 70 which extends around the entire outer periphery of the piston. This insures actuation of the pistons even though they may be in abutment with their associated labyrinth seals.

Figure 3:
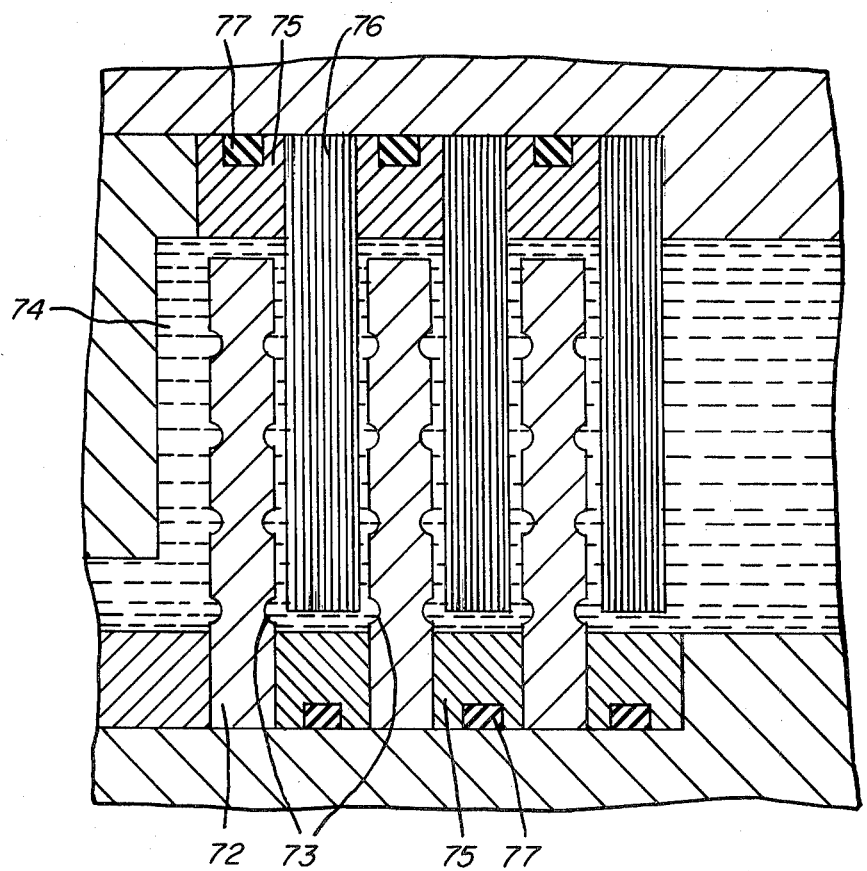
FIG. 3 illustrates the details of the labyrinth seals utilized in the invention.

As will be understood, the rotary fluid couplings of FIGS. 1 and 2 can be used with the outer hub rotating while the inner shaft is stationary, or vice versa. The labyrinth seals 22 and 51 of both embodiments of the invention can be of the type shown in FIG. 3. The two end faces of the discrete discs 72 which abut the internal shaft can be provided with concentric annular grooves 73 which serve to receive any dirt contained in the lubricant 74. The rings 75 which space the discs 72 and 76 are provided, on their peripheries which abut an associated surface, with ring seals 77.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A rotary fluid coupling for interconnecting a liquid-conveying duct in a shaft element to a duct in a hub element, at least one of said shaft and hub elements being rotatable relative to the other, said fluid coupling comprising a bore in said hub element which receives said shaft element, an annular piston completely surrounding said shaft element and reciprocable in said bore, sealing means between said piston and said shaft and between said piston and said bore, said piston forming a wall of a chamber which connects the duct in the shaft element to the duct in the hub element, closure means for at least one end of said bore, a seal disposed around said shaft element between said piston and said closure means at said one end of said bore, said seal sealingly engaging said shaft element and said bore, a lubricating material in the bore between said piston and said seal, said piston being located between said duct in the hub and said seal, and spring means urging said piston toward said seal to pressurizing said lubricating material in the bore in the absence of pressure in said ducts, and when pressure is present in said ducts said piston is urged against said lubricating material by the pressure of the liquid in said chamber and said spring means thereby subjecting said seal to substantially the pressure of the liquid in the chamber.

2. The fluid coupling of claim 1 wherein said seal comprises a labyrinth seal.

3. The fluid coupling of claim 2 wherein said labyrinth seal is formed from interleaved discs.

4. The fluid coupling of claim 1 wherein there are two annular pistons surrounding said shaft forming said chamber therebetween.

5. The fluid coupling of claim 4 wherein there are two seals disposed around said shaft on the sides of said pistons opposite said chamber, said lubricating material being disposed in chambers in said bore formed between said pistons and said seals.

6. The fluid coupling of claim 5 including a bore interconnecting said chambers containing the lubricating material.

7. The fluid coupling of claim 4 wherein said spring means is disposed between said pistons.

8. The fluid coupling of claim 7 including an annular spacer between said pistons which limits travel of the pistons toward each other.

9. The fluid coupling of claim 7 wherein said spring means comprises coil springs extending parallel to the axis of said bore.

10. The fluid coupling of claim 1 wherein said duct in said shaft element includes a radially-extending portion and said duct in the hub element extends radially through the wall of the hub element.

11. The fluid coupling of claim 1 wherein said duct in the shaft element and said duct in the hub element extend along the axis of said bore with the duct in the hub element extending through an end wall thereof.

* * * * *

UNITED STATES PATENT OFFICE
CERTIFICATE OF CORRECTION

Patent No. 4,396,212                    Dated August 2, 1983

Inventor(s) Heinrich Honke

It is certified that error appears in the above-identified patent and that said Letters Patent are hereby corrected as shown below:

add to the facing sheet:

Foreign Application Priority Data

April 21, 1979 [DE] Fed. Rep. of Germany...2916196

Signed and Sealed this

Twenty-fifth Day of October 1983

[SEAL]

Attest:

GERALD J. MOSSINGHOFF

Attesting Officer    Commissioner of Patents and Trademarks